United States Patent [19]

Huffman et al.

[11] 4,101,544

[45] Jul. 18, 1978

[54] WATER SOLUBLE MONOAZO DYES FOR POLYAMIDE MATERIAL

[75] Inventors: Allan M. Huffman, Lock Haven; Paul R. Horinka, West Lawn; Dominic A. Zanella, Lock Haven, all of Pa.

[73] Assignee: American Color & Chemical Corporation, Charlotte, N.C.

[21] Appl. No.: 617,149

[22] Filed: Sep. 26, 1975

[51] Int. Cl.² .................... C09B 29/08; C09B 29/26
[52] U.S. Cl. .................................. 260/207.1; 260/207
[58] Field of Search ............................ 260/207, 207.1

[56] References Cited

U.S. PATENT DOCUMENTS

| | | | |
|---|---|---|---|
| 2,045,324 | 6/1936 | Felix et al. | 260/207 X |
| 2,323,314 | 7/1943 | Dickey et al. | 260/207.1 X |
| 3,657,220 | 4/1972 | Kilmurray | 260/207 |
| 3,676,050 | 7/1972 | James | 260/184 |
| 3,775,049 | 11/1973 | Wolfrum et al. | 260/207.1 X |
| 3,884,901 | 5/1975 | Renfrew et al. | 260/207 |

*Primary Examiner*—Charles F. Warren
*Attorney, Agent, or Firm*—Armstrong, Nikaido, Marmelstein & Kubovcik

[57] ABSTRACT

A series of water soluble azo dyes for dyeing polyamide fiber material are provided by coupling an appropriate diazotized aminobenzene into an appropriately substituted N-alkyl-N-benzoxyethylarylamine. The dyes are characterized by the presence of one sulfonic acid group, either as the free acid or in salt form, and by the presence of a benzoate ester group. When dyed from an appropriate dye bath, these dyes produce dyeings on polyamide fiber material characterized by outstanding lightfastness and excellent transfer properties.

3 Claims, No Drawings

WATER SOLUBLE MONOAZO DYES FOR POLYAMIDE MATERIAL

BACKGROUND OF THE INVENTION

A great many azo dyes have been proposed over the past century which contain sulfonic acid substituents. Such dyes have traditionally found application as acid dyes for wool fabric materials. Although extensive research has been conducted in this area of dye chemistry over the past century, recent demands for dyes with specific properties applicable to new fabric materials have rendered most of such early dyes inapplicable to modern needs. As one example of a specialized area of dye application may be mentioned carpet dyeing. In the dyeing of carpets, it is necessary to provide a dye with excellent "transfer". The transfer properties of a dye relate to the ability of the dye to produce level dyeings even in heavy fabrics and with filaments of a large diameter. Nylon carpeting represents a prime example of such a fiber material which requires a dye having excellent transfer properties. Other problems which occur in the dyeing of nylon carpeting are occasioned by variations in the carpeting itself; for example, nylon carpeting may have localized areas of differing crystallinity, due perhaps to differing stresses established in the drawing to which the fiber is subjected during manufacture. Such localized areas accept the acid dyes at different rates and in varying amounts, depending upon the physical characteristics of the carpet in each area. With a dye of excellent transfer properties, it is possible to dye the carpeting with an evenness not possible with dyes lacking such transfer properties. In addition to transfer properties, fastness to light is also an important consideration.

We have discovered a new series of acid dyes which dye polyamide fiber material, in particular carpet material, in bright reddish yellow hues. The dyeings are characterized by outstanding lightfastness and transfer and reserve properties.

Water insoluble dyes bearing some structural resemblance to the dyes of the invention are known. Carmichael in U.S. Pat. No. 3,497,495 discloses monoazo dyes containing methylsulfonyl groups and N-acetoxyethyl groups. However, these dyes, being water insoluble, are recommended for polyester and, if used to dye nylon, would dye all forms of nylon to essentially equal depths. In contrast, the dyes of the invention have a very marked difference of affinity for different types of nylon, such as the Types 844, 845, 846, and 847 BCF nylons.

Felix and Capeller in U.S. Pat. No. 2,354,187 disclose N-(carboxy substituted benzoxyethyl)monoazo dues and N-(carboxysubstituted alkyloxyethyl)monoazo dyes that contain the methylsulfonyl group. These dyes are water soluble because of the presence of the carboxyl group and they are structurally dissimilar because the solubilizing group is on the ester portion of the molecule. These dyes said to be particularly useful for dyeing cellulose ethers.

Felix and Huber in U.S. Pat. No. 2,045,324 disclose the possibility of making N-acetoxyethylazo dyes which could be water soluble, depending on the choice of diazotizable aryl amine base. The dyes disclosed in this patent are disclosed as colors for wool, silk and cellulose.

SUMMARY OF THE INVENTION

In accordance with the invention there is provided a dye of the formula:

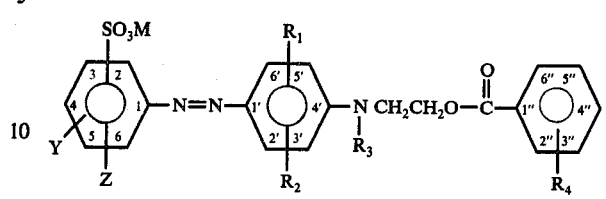

wherein:
(1) M is a member selected from the group consisting of alkali metal ions, the ammonium ion and hydroxyalkyl ammonium ions, the alkyl portion of which has from 3 - 12 carbon atoms;
(2) Y and Z are members independently selected from the group consisting of hydrogen, chlorine, bromine and lower alkyl;
(3) $R_1$ and $R_2$ are members independently selected from the group consisting of hydrogen, lower alkyl, lower alkoxy, chlorine and bromine;
(4) $R_3$ is a member selected from the group consisting of lower alkyl and cyano lower alkyl; and
(5) $R_4$ is a member selected from the group constituting hydrogen chlorine, bromine and lower alkyl.

Within the above definition it is understood that $SO_3M$ represents both the free acid and the various salt forms which are suitable for use in the dyeing process such as sodium, potassium, and nitrogen containing salt forms. The term lower alkyl when used herein, either substituted or unsubstituted, refers to an alkyl group having up to 6 carbon atoms.

In accordance with another aspect of the invention, there is provided dyed polyamide fiber material and in the preferred form, dyed nylon carpet, the coloration of which is accomplished by the application of the dye of the invention to polyamide material by conventional procedures known to the trade.

DETAILED DESCRIPTION OF THE INVENTION

The dyes of the invention, which are characterized by the presence of one sulfonic acid group, corresponding to the formula $SO_3M$, are made by conventional procedures by adding a diazotized aminobenzene to a solution of an appropriate coupling component.

Typical aminobenzenes useful as the diazotizable base in the coupling reaction are sulfanilic acid, 4-chlorometanilic acid, metanilic acid, 2,5-dichlorosulfanilic acid, 4-methoxymetanilic acid, 6-chlorometanilic acid, 4-bromometanilic acid, 4-chloro-5-methylorthanilic acid and the like.

The aminobenzene intermediate is diazotized in the usual way by heating it in an aqueous solution of strong mineral acid such as hydrochloric acid, cooling the resulting solution to a temperature of 0°-10° C. and adding thereto a quantity of sodium nitrite slightly in excess of the stoichiometric requirement. An alternate method of diazotization involves dissolving sodium nitrite in concentrated sulfuric acid, heating to a temperature of about 60°-70° C., cooling the resulting solution to 0°-10° C. and adding thereto the aminobenzene.

Couplers useful in preparing the dyes of the invention include 2-(N-ethylanilino)-ethyl benzoate, 2-(N-ethyl-m-toluidino)-ethyl benzoate, 2-(N-cyanoethyl-o- chloroanilino)-ethyl benzoate, 2-(N-methylanilino)-ethyl benzoate and the like.

The azo dyestuffs used in the invention are made by the reaction of the diazotized aminobenzene with the coupler in a cold aqueous solution. A buffering agent, such as sodium acetate, may be added to increase the rate of coupling. The mixture is allowed to react for 8 to 24 hours at room temperature and is thereafter filtered. The desired azo product is thus obtained in the form of a wet cake.

The carpet material to be dyed may be broadly defined as a polyamide fiber material. As a preferred polyamide fiber material may be mentioned the various members of the nylon family. For example, the polyamide fiber materials to be colored in accordance with the invention include polyhexamethylene adipamide, poly-(2-methylhexamethyleneoxamide) and polycaprolactam. General procedures for using an acid dye for the coloration of a polyamide fiber material are known in the art; examples of suitable methods for dyeing the polyamide material are found in U.S. Pat. No. 3,485,814 and in the examples that follow.

Our invention is further illustrated by the following examples:

EXAMPLE 1

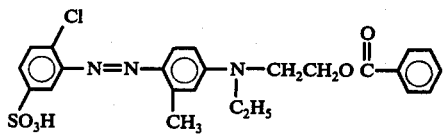

Diazo Preparation

There was charged to a 1000 ml. beaker, 80 g. of water, 25 g. of 32% hydrochloric acid and 20.8 g. 4-chlorometanilic acid. The mixture was stirred to a uniform slurry, iced to 0° C and at 0°–5° C over a period of 15 minutes there was added a solution of 7.0 g. sodium nitrite in 20 g. of water. The excess nitrous acid was destroyed with 0.4 g. sulfamic acid. The pH of the diazo was adjusted to 4 with 15 g. sodium acetate.

Coupler Preparation

There was charged to a 400 ml. beaker, 140 g. glacial acetic acid and 28.3 g. N-benzoxyethyl-N-ethyl-metatoluidine.

Coupling

The coupler solution was added to the diazo over 1½ hours at 0°–5° C. The pH was held between 3 and 4 addition of 29 g. sodium acetate. The mixture was stirred overnight without temperature control. The next day 191 g. 50% sodium hydroxide was added to a pH of 8.0. The mass was stirred for 1 hour and filtered. The wet cake was dried. Yield 84.1 g.

EXAMPLE 2

A dyebath was prepared from 0.2 g. of dye from Example 1; 330 ml. water, 10 ml. of 10% sodium phosphate, monobasic and 0.2 g. of a dyeing assistant ("AMINOGEN 41", a commercially available anionic material). The pH was adjusted to 6.0 with 5% aqueous sodium hydroxide or 5% aqueous acetic acid. A 10.0 g. nylon skein (BCF, T-846, duPont) was placed in the dyebath. The dyebath was heated to the boil and the skein was turned in the boiling bath for 1 hour. The skein was removed, soaped, rinsed and dried.

The dyed skein showed the following A.A.T.C.C. ratings after exposure in the Xenon Fade-Ometer.

40 hrs: 4 – 5

A skein dyed according to the above procedure was placed in a bath prepared as above, but without the 0.2 g. of dye. An undyed 10.0 g. skein was entered. The two skeins were turned in the boiling bath for 1 hour. The skeins were removed from the bath, soaped, rinsed, and dried. The hue of each was bright yellow.

The transfer property of the dye is shown by the K/S values. The first skein (originally dyed) now showed a value of 4.10; the originally undyed skein was 4.10, showing that the dye has distributed itself equally between the skeins; in other words that the transfer was 100%.

EXAMPLE 3

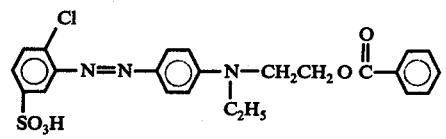

The procedure of Example 1 was repeated with the exception that 27 g. of N-benzoxyethyl-N-ethylaniline was substituted as the coupling component in lieu of the N-benzoxyethyl-N-ethyl-m-toluidine. Yield of dry dye: 72.5 g.

Example 4

The dye was dyed by the same procedure described in Example 2. The hue is bright yellow. The A.A.T.C.C. rating after exposure in the Xenon Fade-Ometer for 40 hours was 4 – 5. The transfer property of the dye was excellent.

EXAMPLES 5 – 10

By following the above described procedures similar excellent results in the dyeing of nylon fiber material may be obtained using dyes having the structures given in the following Table. In the Table the substituents are designated to correspond with those of the previously given general formula.

TABLE

| Example No. | Position of $SO_3M$ | M | Y | Z | $R_1$ | $R_2$ | $R_3$ | $R_4$ | Color |
|---|---|---|---|---|---|---|---|---|---|
| 5 | 2- | $NH_4^+$ | 4-Cl | 5-$CH_3$ | H | H | $C_2H_5$ | H | yellow |
| 6 | 2- | Na | 4-Br | H | 5'-$OCH_3$ | H | $CH_3$ | H | orange |
| 7 | 3- | Na | 6-Cl | H | 5'-$CH_3$ | H | $C_2H_4CN$ | 3''-Cl | yellow |
| 8 | 3- | Na | 6-Cl | H | 3'-Cl | H | $C_2H_5$ | 4''-$CH_3$ | reddish yellow |
| 9 | 3- | Na | H | H | 3'-Br | H | $C_2H_5$ | 3''-Br | yellow |
| 10 | 3- | $(HOC_2H_4)_3NH^+$ | 6-Cl | H | H | H | $C_2H_5$ | H | yellow |

We claim:
1. A dye of the formula:

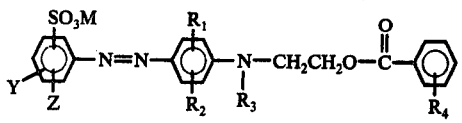

wherein:
(a) M is hydrogen or a member selected from the group consisting of alkali metal ions, the ammonium ion and hydroxylalkyl ammonium ions, the alkyl portion of which has from 3 to 12 carbon atoms;
(b) Y and Z are members independently selected from the group consisting of hydrogen, chlorine, bromine and lower alkyl;
(c) $R_1$ and $R_2$ are members independently selected from the group consisting of hydrogen, lower alkyl, lower alkoxy, chlorine and bromine;
(d) $R_3$ is a member selected from the group consisting of lower alkyl and lower alkyl cyano; and
(e) $R_4$ is a member selected from the group consisting of hydrogen, chlorine, bromine and lower alkyl.

2. A dye of claim 1 having the formula:

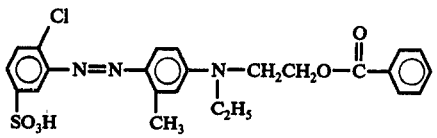

3. A dye of claim 1 having the formula:

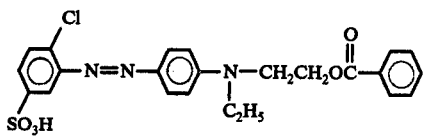

* * * * *